(12) United States Patent
Dongaonkar et al.

(10) Patent No.: US 12,265,724 B2
(45) Date of Patent: Apr. 1, 2025

(54) DATA ACCESS ORDERING FOR WRITING-TO OR READING-FROM MEMORY DEVICES

(71) Applicant: Intel Corporation, Santa Clara, CA (US)

(72) Inventors: Sourabh Dongaonkar, Portland, OR (US); Jawad B. Khan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/337,314

(22) Filed: Jun. 2, 2021

(65) Prior Publication Data
US 2021/0286551 A1 Sep. 16, 2021

(51) Int. Cl.
*G06F 3/06* (2006.01)

(52) U.S. Cl.
CPC .......... *G06F 3/0655* (2013.01); *G06F 3/0604* (2013.01); *G06F 3/064* (2013.01); *G06F 3/0679* (2013.01)

(58) Field of Classification Search
None
See application file for complete search history.

(56) References Cited

U.S. PATENT DOCUMENTS

| 11,416,170 | B2 | 8/2022 | Khan et al. | |
| 11,435,941 | B1 * | 9/2022 | Xu | G06N 5/04 |
| 2018/0088834 | A1 * | 3/2018 | Sundaram | G06F 13/16 |

* cited by examiner

*Primary Examiner* — Kevin Verbrugge
(74) *Attorney, Agent, or Firm* — Compass IP Law PC

(57) ABSTRACT

Examples described herein relate to an apparatus comprising: circuitry to receive a request to store data as a part of a matrix in a memory device; circuitry to allocate address mappings to the data to reduce a number of sequential accesses to a same partition of a portion of the memory device; circuitry to store the address mappings for access with a read operation; and circuitry to cause storage of the data into the memory device according to the address mappings. In some examples, the matrix comprises one or more columns and/or one or more rows. In some examples, the memory device comprises one or more of: a three-dimensional (3D) cross point memory device, volatile memory device, or non-volatile memory device.

19 Claims, 11 Drawing Sheets

| Address | PART0 | PART1 | PART2 | ... | PART30 | PART31 |
|---|---|---|---|---|---|---|
| 0 | R000C000 | R000C001 | R000C002 | ... | R002C006 | R002C007 |
| 1 | R002C008 | R002C009 | R002C010 | ... | R005C002 | R005C003 |
| 2 | R005C004 | R005C005 | R005C006 | ... | R007C010 | R007C011 |
| 3 | R008C000 | R008C001 | R008C002 | ... | R010C006 | R010C007 |
| 4 | R010C008 | R010C009 | R010C010 | ... | R013C002 | R013C003 |
| 5 | R013C004 | R013C005 | R013C006 | ... | R015C010 | R015C011 |

Block 0

Block 1

| Address | PART0 | PART1 | ... | PART9 | ... | PART11 | ... | PART30 | PART31 |
|---|---|---|---|---|---|---|---|---|---|
| 0 | R00C00 | R00C01 | ... | R00C09 | ... | R00C11 | ... | R00C30 | R00C31 |
| 1 | R01C00 | R01C01 | ... | R01C09 | ... | R01C11 | ... | R01C30 | R01C31 |
| 2 | R02C00 | R02C01 | ... | R02C09 | ... | R02C11 | ... | R02C30 | R02C31 |
| 3 | R03C00 | R03C01 | ... | R03C09 | ... | R03C11 | ... | R03C30 | R03C31 |
| 4 | R04C00 | R04C01 | ... | R04C09 | ... | R04C11 | ... | R04C30 | R04C31 |
| ... | ... | ... | ... | ... | ... | ... | ... | ... | ... |
| 30 | R30C00 | R30C01 | ... | R30C09 | ... | R30C11 | ... | R30C30 | R30C31 |
| 31 | R31C00 | R31C01 | ... | R31C09 | ... | R31C11 | ... | R31C30 | R31C31 |

| Address | PART0 | PART1 | PART2 | ... | PART30 | PART31 |
|---|---|---|---|---|---|---|
| 0 | R000C000 | R000C001 | R000C002 | ... | R002C006 | R002C007 |
| 1 | R002C008 | R002C009 | R002C010 | ... | R005C002 | R005C003 |
| 2 | R005C004 | R005C005 | R005C006 | ... | R007C010 | R007C011 |
| 3 | R008C000 | R008C001 | R008C002 | ... | R010C006 | R010C007 |
| 4 | R010C008 | R010C009 | R010C010 | ... | R013C002 | R013C003 |
| 5 | R013C004 | R013C005 | R013C006 | ... | R015C010 | R015C011 |

Block 0 — Block 1

FIG. 6B

| Address | PART0 | PART1 | PART2 | ... | PART30 | PART31 |
|---|---|---|---|---|---|---|
| 0 | R000C000 | R000C001 | R000C002 | ... | R002C006 | R002C007 |
| 1 | R002C008 | R002C009 | R002C010 | ... | R005C002 | R005C003 |
| 2 | R005C004 | R005C005 | R005C006 | ... | R007C010 | R007C011 |
| 3 | R015C011 | R008C000 | R008C001 | ... | R010C005 | R010C006 |
| 4 | R010C007 | R010C008 | R010C009 | ... | R013C001 | R013C002 |
| 5 | R013C003 | R013C004 | R013C005 | ... | R015C009 | R015C010 |

FIG. 6C

DATA ACCESS ORDERING FOR WRITING-TO OR READING-FROM MEMORY DEVICES

In some compute operations, such as matrix multiplication or addition operations, data is manipulated by a compute device in rows and columns. Matrix data is stored in memory in a row-major format or column-major format. In a row-major format, consecutive elements of the rows of the matrix are stored in contiguous physical addresses in a memory device. Conversely, in a column-major format, consecutive elements of the columns are stored in contiguous physical addresses in a memory device. A matrix multiplication operation involves reading a given matrix in row-major format, reading another matrix in column-major format, and multiplying the respective rows and columns with one another. In some cases, the memory may store matrices in either row-major or column-major format and convert a matrix to column-major or row-major during a matrix operation. However, performing a conversion can increase time to complete the matrix operation and increase an amount of computational resources used in the matrix operation. As an alternative, a matrix may be stored in both row-major and column-major formats, but doing so increases memory usage.

BRIEF DESCRIPTION OF THE DRAWINGS

FIG. 4 shows an example logical layout of matrix data that is stored in a memory device.

FIG. 6A depicts an example logical layout of data stored in a logical column.

FIG. 6B depicts an example in which a block size can be determined.

FIG. 6C shows a logical data storage layout across partitions which attempts to avoid multiple attempted reads of a same partition sequentially while reading in a row or column direction.

DETAILED DESCRIPTION

Various embodiments cause data to be stored in a media in at least one manner so that different partitions can be read consecutively or sequentially in connection with a read operation to reduce consecutive or sequential read operations from a same partition and reduce delays arising from reading data from a memory device. Various embodiments potentially permit rows or columns of multiple bytes to be read at equal approximately speeds. Various embodiments provide a data layout pattern in memory media by address rotations prior to writing to the memory media. Various embodiments provide reading of a single row or single column of code words at approximately a same amount of time. In some examples, a write and/or read of a column of data can be performed without any memory media or memory controller hardware changes as logical to physical address mappings to reduce consecutive or sequential write operations to a same partition and/or read operations from a same partition can be defined by software. Various embodiments provide data layout and address translations performed by a middleware layer software or firmware, without invocation by an application layer. Various embodiments can be utilized to perform multiple bit column and/or row read operations (e.g., codeword size or larger) without modification of persistent memory dual inline memory modules (DIMMs), such as Intel® Optane™ memory, as well as other memory technologies described herein. Various embodiments can be applicable to any memory technology that can accommodate row and column read operations, such as but not limited to static random access memory (SRAM) arrays. In some examples, changes to memory media or memory controller hardware can be made to reduce consecutive or sequential write operations to a same partition and/or read operations from a same partition. Memory cells that can be accessed as rows and/or by columns can allow for faster performance of processes such as similarity search, databases, and genomic analysis, among others. Various embodiments can provide for storage of error correction coding (ECC) protected and encrypted data of a logical column.

Figure 1:
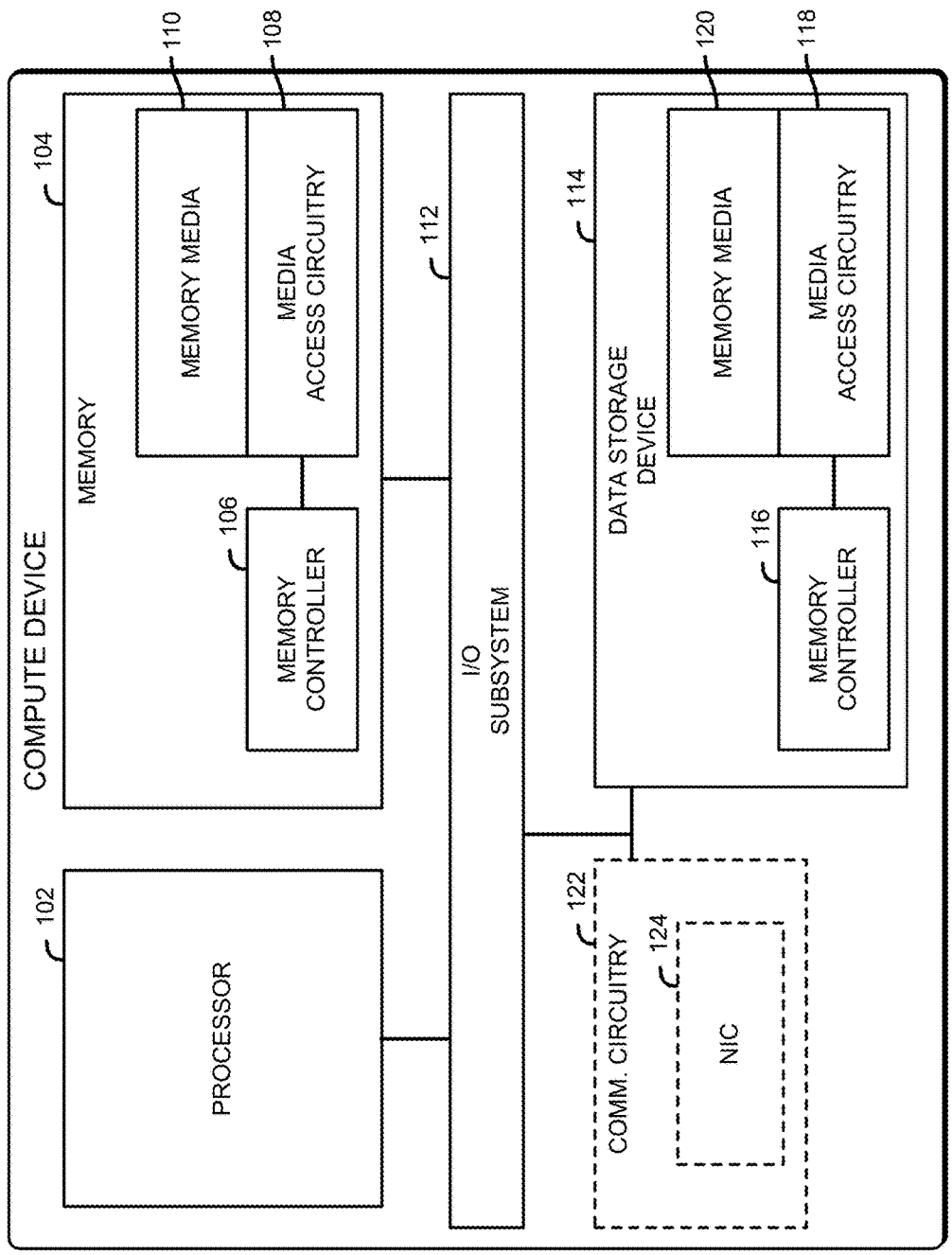
FIG. 1 shows an example of a system.

FIG. 1 shows an example of a system. Compute device 100 can include a processor 102, memory 104, an input/output (I/O) subsystem 112, a data storage device 114, and communication circuitry 122. Compute device 100 may include other or additional components, such as those commonly found in a computer (e.g., a display, peripheral devices, etc.). Additionally, in some embodiments, one or more of the illustrative components may be incorporated in, or otherwise form a portion of, another component. As described herein, compute device 100 can provide access to selected rows and/or columns of data in memory 104. In some examples, processor 102, memory controller 106, media access circuitry 108, memory controller 116, and/or media access circuitry 118 can determine an address for data in order to store the data in media 110 and/or 120 in a manner that reduces sequential and/or consecutive reads from a same partition. For example, blocks of one or more rows of data can be identified such that at block boundaries, a right shift of a logical address assigned to a particular data. An extent of a right shift of a logical address assigned to a particular data can be based on a block index value. Shifting the logical addresses can cause a rotation of logical address assignments to data.

Processor 102 can include any device or circuitry (e.g., a multi-core processor(s), a microcontroller, or other processor or processing/controlling circuit) capable of executing a workload (e.g., a set of operations, such as an application that may produce requests to read from and/or write to sections of memory, such as selected columns and/or rows of data in a matrix) and/or performing other operations described herein. In some embodiments, the processor 102 may be embodied as, include, and/or be coupled to a field programmable gate array (FPGA), an application specific integrated circuit (ASIC), reconfigurable hardware or hardware circuitry, or other specialized hardware to facilitate performance of the functions described herein. Processor 102 can execute an application, service, microservice, virtual machine (VM), and/or container that requests to read from or write to the memory media 110.

Memory 104 may include a non-volatile memory (e.g., a far memory in a two-level memory scheme), a memory media 110, and media access circuitry 108 (e.g., a device or circuitry, such as integrated circuitry constructed from complementary metal-oxide-semiconductors (CMOS) or other materials). Media access circuitry 108 can be connected to a memory controller 106, which may be embodied as any device or circuitry (e.g., a processor, a co-processor, dedicated circuitry, etc.) configured to selectively read from and/or write to the memory media 110 (e.g., in response to requests from the processor 102.

Memory 104 may include non-volatile memory and/or volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross-point architecture that enables byte-level addressability or other larger units of data, such as three-dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (Fe-TRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables byte-level addressability, similar to the architecture described above.

Processor 102 and the memory 104 can be communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

Data storage device 114, may be embodied as any type of device configured for short-term or long-term storage of data such as, for example, memory devices and circuits, memory cards, hard disk drives, solid-state drives, or other data storage device. Data storage device 114 may include a system partition that stores data and firmware code for the data storage device 114 and one or more operating system partitions that store data files and executables for operating systems.

Communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, 4G LTE, 5G, etc.) to perform such communication.

Communication circuitry 122 can include a network interface controller (NIC) 122, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 2:
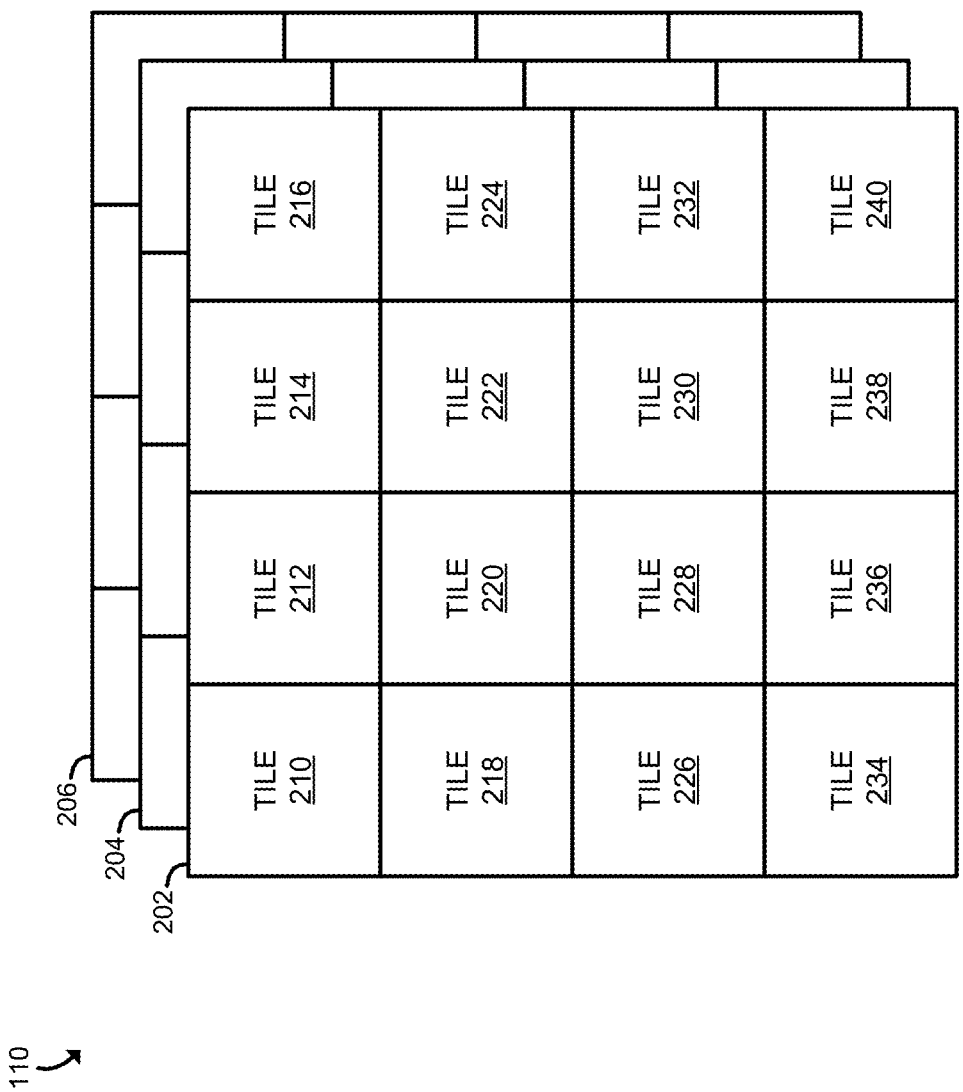
FIG. 2 shows an example of memory media.

FIG. 2 shows an example of memory media. In some examples, a memory media includes at least one or more of tiles 210, 212, 214, 216, 218, 220, 222, 224, 226, 228, 230, 232, 234, 236, 238, and/or 240. A tile can represent or include an addressable section of memory media 110 capable of retaining data and being read-from. Addressable sections of memory media capable of retaining data and being read-from can be arranged in a cross point architecture in which a tile can be addressable by a column parameter and a row parameter. A cross point architecture can include an architecture in which memory cells are positioned at the intersection of word lines and bit lines and are individually addressable and in which bit storage is based on a change in bulk resistance. A set of tiles may form a partition and multiple partitions may be stacked as layers 202, 204, 206 to form a three-dimensional cross point architecture (e.g., 3D XPoint™ from Intel Corporation or Micron Technology, Inc.).

Figure 3:
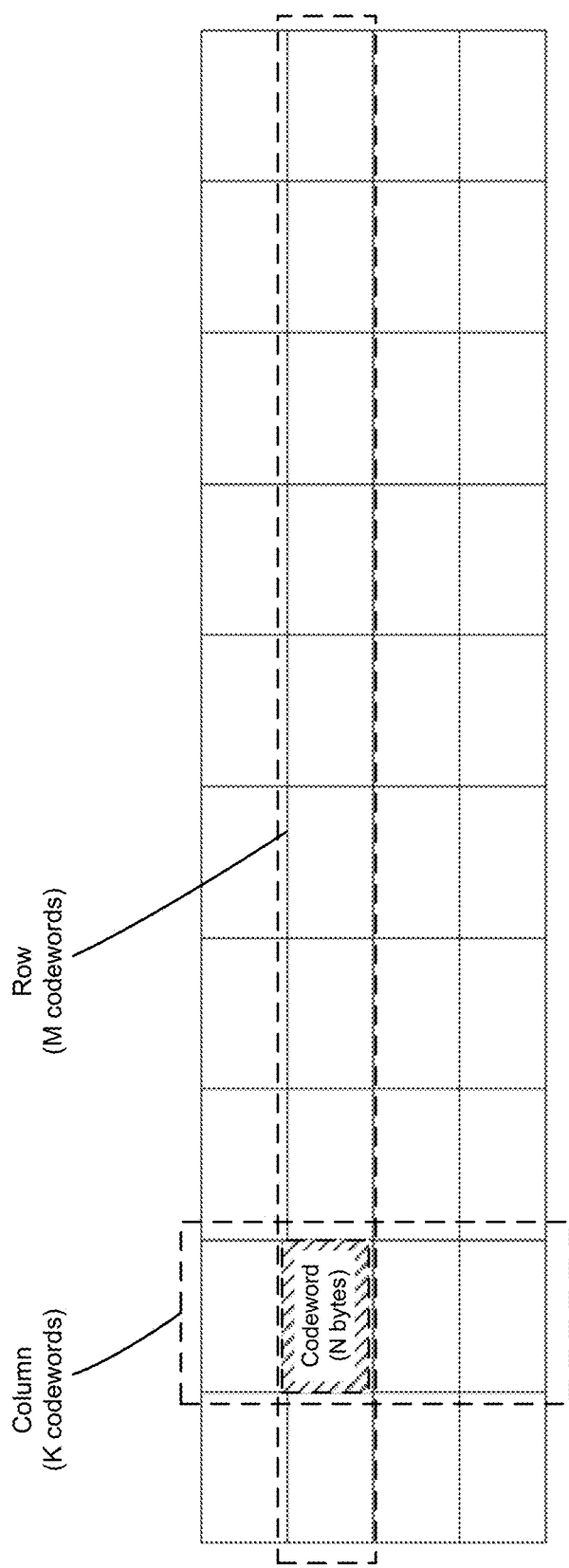
FIG. 3 shows a matrix dataset formatted to be written or read in row and column manner at codeword granularity.

FIG. 3 shows a matrix dataset formatted to be written or read in row and column manner at codeword granularity. In some examples, a readable or writeable element of a matrix can include a single codeword. In some examples, a number of bytes in a codeword can be in N bytes, where N is 1 or more, although one or multiple bits can be accessed. For example, a codeword can be 256B, 128B, 64B, 32B, and so forth. In some examples, a codeword includes multiple bits. For example, reading a column can include reading integer K number of codewords, where K is 1 or more. For example, reading a row can include reading integer M number of codewords, where M is 1 or more. A column read can include reading multiple rows and filtering data from the read rows to output a column of data.

FIG. 4 shows an example logical layout of matrix data that is stored in a memory device. The data can be stored as codewords across one or more partitions and one or more row addresses.

In a particular layout, a column is mapped to a single partition (e.g., column 0 to partition 0, column 1 to partition 1, and so forth). In this example, 32 by 32 codewords can be organized as rows and partitions. For example, highlighted partition number 9 can be read. For example, to read a partition 9, 32 codewords can be read in the vertical direction. Reading from partition 9 can involve row reads for addresses 0 to 31 from partition 9, which involves accessing partition 9 a total of 32 times. In some examples, after a read request is issued to read a partition, a time elapses (e.g., partition busy time) before another request to read the same partition can be issued. In other words, reading from a partition involves waiting for a prior read to the partition to complete. However, a row read can take less time because different partitions are read. For example, for a partition busy time of 100 ns, reading 32 codewords in the vertical direction for column 9 can take 32*100 ns, whereas reading a row can take 32*5 ns.

Various embodiments provide a layout of codewords among rows and partitions so that different partitions can be read at overlapping times and attempt to avoid reading from a same partition before completion of a prior read to the same partition to reduce serial delays from partition read completion. Various embodiments can provide reading of a single row or single column at approximately a same amount of time, where each row and column are composed on several codewords, by avoiding partition conflicts during column read.

Various embodiments attempt to provide reads of a logical column of data at approximately a same speed as reads of a logical row of data by reading multiple partitions sequentially. In some examples, approximately a 5 ns delay is incurred between reading different partitions. For example, to read a column of data, reads can be issued to different partitions sequentially and approximately 160 ns can be taken (e.g., 32 codewords*5 ns) to read 32 codewords of a column of data. For example, to read a row, different partitions can be read successively. Reads can be issued to different partitions sequentially and approximately 160 ns can be taken (e.g., 32 codewords*5 ns) to read 32 codewords of a row. Various embodiments reorder data after reading from different partitions to provide data that was read for a logical column across multiple partitions to provide data as presented for writing to the media, despite storage in the media in a particular order to reduce successive reads from a same partition.

Figure 5:
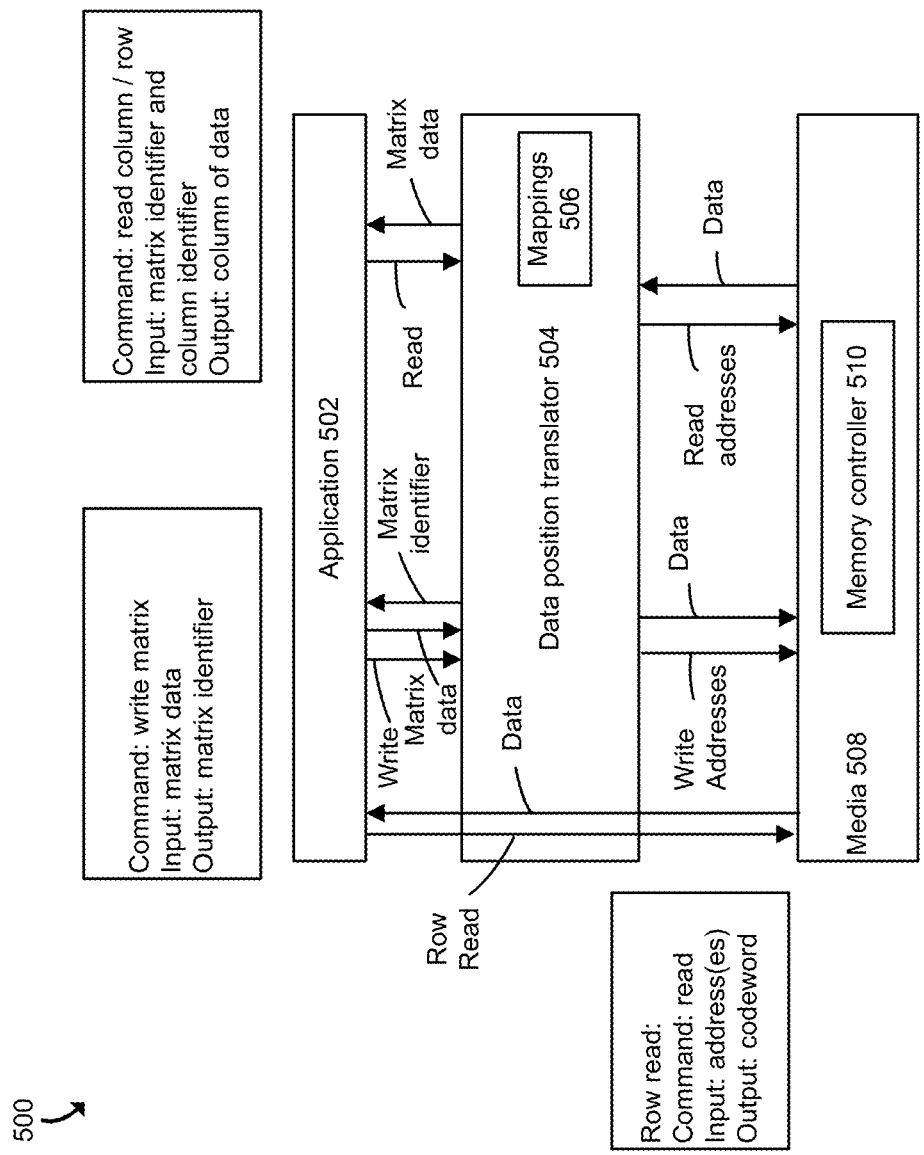
FIG. 5 depicts an example system that can be used to provide for writing and reading codewords or data.

FIG. 5 depicts an example system that can be used to provide for writing and reading codewords or data. In some examples, data position translator 504 can execute on a processor (e.g., CPU, XPU, GPU, or other device) or by a memory controller in a host system or device in media 508. Data position translator 504 can intercept or directly receive read or write requests from application 502 to a memory controller (MC) 510 associated with media 508. Application 502 can represent one or more of: a virtual machine (VM), container, service, microservice, application, binary, or any processor-executable code segment. Application 502 can issue a column or row write operation or column or row read operation to data position translator 504 or to memory controller 510, which is intercepted by data position translator 504.

In some examples, data position translator 504 can be used to access a region of media 508 used for column and row access for data that is stored as a matrix, which can be separate from one or more other regions of the memory that may not be used to store a matrix. For example, different sized matrices can be stored in different regions of media 508.

For a data matrix write to media 508, application 502 can present a matrix write command to data position translator 504. If there is enough available memory to write an entire matrix, data position translator 504 can select an address range that can store the matrix data and write the matrix data in a format, described herein, to reduce a number of consecutive or sequential reads from a same partition. Data position translator 504 can format the data in a matrix of N byte codewords, and write the data into media 508 in accordance with embodiments described herein. For example, data position translator 504 can generate a sequence of writes to media 508 to write the matrix data in a data storage layout across partitions whereby codewords can be split across partitions or data written to partitions to reduce successive accesses to a same partition if a column read operation is received subsequently. For example, as described herein, blocks of one or more rows of data can be identified and at block boundaries, a logical address assigned to a particular data can be incremented in column position by an associated block index value of zero or more. For examples, rows and columns of data can be written and read in a manner depicted in FIG. 6C. Storing rows and columns in media 508 in a manner depicted in FIG. 6C can reduce multiple or sequential reads from a same partition and can allow rows and columns to be read at approximately same speeds or rates.

Application 502 may not have information on an actual physical location of data in media 508. Data position translator 504 can provide a matrix identifier or pointer to the data to application 502 and application 502 can provide the matrix identifier or pointer to access this matrix. Data position translator 504 can create and maintain a mapping 506 between memory addresses in media 508 and a matrix identifier as well as a relationship between logical column identifier(s) and row identifier(s) and physical addresses in media 508. Data position translator 504 can maintain a mapping of matrix identifier to start address in media 508. Matrix identifier (ID) M can map to matrix start address A in media 508 and a column or row read/write request can be translated into a series of physical address and partition identifier (ID) values by data position translator 504. Some examples of these are shown in Table 1 for a matrix M with 12 columns that starts at address A in the physical memory. For example, a format of mapping 506 can be as shown in Table 1. However, in some examples, instead of, or in addition to using a table, address translation can be performed using a circuitry that performs calculations such as modulo, addition, and/or subtraction.

TABLE 1

| Column identifier | Physical column addresses | Row identifier | Physical (address, partition ID) pairs |
|---|---|---|---|
| 0 | (A + 0, 0), (A + 0, 12), (A + 0, 24), (A + 1, 4), (A + 1, 16), (A + 1, 28), (A + 2, 8), (A + 2, 20), (A + 3, 1), (A + 3, 13), (A + 3, 25), (A + 4, 5), (A + 4, 17), (A + 4, 29), (A + 5, 9), (A + 5, 21), (A + 6, 2), (A + 6, 14), (A + 6, 26), (A + 7, 6), (A + 7, 18), (A + 7, 30), (A + 8, 10), (A + 8, 22), (A + 9, 3), (A + 9, 15), (A + 9, 27), (A + 10, 7), (A + 10, 19), (A + 10, 31), (A + 11, 11), (A + 11, 23) | 0 | (A, 0) . . . (A, 11) |
| 1 | (A + 0, 1), (A + 0, 13), (A + 0, 25), (A + 1, 5), (A + 1, 17), (A + 1, 29), (A + 2, 9), (A + 2, 21), (A + 3, 2), (A + 3, 14), | 1 | (A, 12) . . . (A, 23) |

TABLE 1-continued

| Column identifier | Physical column addresses | Row identifier | Physical (address, partition ID) pairs |
|---|---|---|---|
|  | (A + 3, 26), (A + 4, 6), (A + 4, 18), (A + 4, 30), (A + 5, 10), (A + 5, 22), (A + 6, 3), (A + 6, 15), (A + 6, 27), (A + 7, 7), (A + 7, 19), (A + 7, 31), (A + 8, 11), (A + 8, 23), (A + 9, 4), (A + 9, 16), (A + 9, 28), (A + 10, 8), (A + 10, 20), (A + 11, 0), (A + 11, 12), (A + 11, 24) |  |  |
| 2 | (A + 0, 2), (A + 0, 14), (A + 0, 26), (A + 1, 6), (A + 1, 18), (A + 1, 30), (A + 2, 10), (A + 2, 22), (A + 3, 3), (A + 3, 15), (A + 3, 27), (A + 4, 7), (A + 4, 19), (A + 4, 31), (A + 5, 11), (A + 5, 23), (A + 6, 4), (A + 6, 16), (A + 6, 28), (A + 7, 8), (A + 7, 20), (A + 8, 0), (A + 8, 12), (A + 8, 24), (A + 9, 5), (A + 9, 17), (A + 9, 29), (A + 10, 9), (A + 10, 21), (A + 11, 1), (A + 11, 13), (A + 11, 25) | 2 | (A, 24) . . . (A, 31), (A + 1, 0) . . . (A + 1, 3) |
| 8 | (A + 0, 9), (A + 0, 21), (A + 1, 1), (A + 1, 13), (A + 1, 25), (A + 2, 5), (A + 2, 17), (A + 2, 29), (A + 3, 10), (A + 3, 22), (A + 4, 2), (A + 4, 14), (A + 4, 26), (A + 5, 6), (A + 5, 18), (A + 5, 30), (A + 6, 11), (A + 6, 23), (A + 7, 3), (A + 7, 15), (A + 7, 27), (A + 8, 7), (A + 8, 19), (A + 8, 31), (A + 9, 12), (A + 9, 24), (A + 10, 4), (A + 10, 16), (A + 10, 28), (A + 11, 8), (A + 11, 20), (A + 9, 0) | 8 | (A + 3, 1) . . . (A + 3, 12) |
| 9 | (A + 0, 9), (A + 0, 21), (A + 1, 1), (A + 1, 13), (A + 1, 25), (A + 2, 5), (A + 2, 17), (A + 2, 29), (A + 3, 10), (A + 3, 22), (A + 4, 2), (A + 4, 14), (A + 4, 26), (A + 5, 6), (A + 5, 18), (A + 5, 30), (A + 6, 11), (A + 6, 23), (A + 7, 3), (A + 7, 15), (A + 7, 27), (A + 8, 7), (A + 8, 19), (A + 8, 31), (A + 9, 12), (A + 9, 24), (A + 10, 4), (A + 10, 16), (A + 10, 28), (A + 11, 8), (A + 11, 20), (A + 9, 0) | 9 | (A + 3, 13) . . . (A + 3, 24) |
| 10 | (A + 0, 10), (A + 0, 22), (A + 1, 2), (A + 1, 14), (A + 1, 26), (A + 2, 6), (A + 2, 18), (A + 2, 30), (A + 3, 11), (A + 3, 23), (A + 4, 3), (A + 4, 15), (A + 4, 27), (A + 5, 7), (A + 5, 19), (A + 5, 31), (A + 6, 12), (A + 6, 24), (A + 7, 4), (A + 7, 16), (A + 7, 28), (A + 8, 8), (A + 8, 20), (A + 6, 0), (A + 9, 13), (A + 9, 25), (A + 10, 5), (A + 10, 17), (A + 10, 29), (A + 11, 9), (A + 11, 21), (A + 9, 1) | 10 | (A + 3, 25) . . . (A + 3, 31), (A + 4, 0) . . . (A + 4, 4) |

Data position translator 504 can provide a matrix identifier to application 502 to identify the matrix written to media 508 so that in a subsequent data read operation(s), the matrix identifier can be used to identify an address translation scheme. In some examples, application 502 does not provide a matrix identifier to data position translator 504 and data position translator 504 can perform address translation based on an address range provided with a read request from application 502.

In response to a read request, mapping 506 can be accessed to determine physical memory addresses in media 508 to access to retrieve data. In some examples, the read request is associated with particular column identifier(s) and/or row identifier(s) and a matrix identifier. In response to a row or column read received from application 502 associated with column identifier(s) and row identifier(s), and a matrix identifier, data position translator 604 can issue read requests to media 508 to read codewords associated with the column identifier(s) and row identifier(s) from media 508.

In some examples, data position translator 504 can cause data read operations to be issued so that data is read from media 508 in an order presented by application 502 for writing to a cache (e.g., level 1 (L1), level 2 (L2), and/or last level cache (LLC)). For example, data position translator 504 can issue a starting memory address and starting partition number through ending memory address and ending partition number to retrieve data from media 508. Data position translator 504 can store address and partition sequences for written data in mappings 506 and use such mappings 506 to read data out in an order so that the data is as it was when provided or presented by application 502. Read data can be written to cache, another memory device, or a same memory device but different location.

With reference to FIG. 4, for example, a read of a start of a column can include a starting address of address 0, partition 9; a read of a next codeword in a column can include an address of address 1, partition 10; a read of a next codeword in a column can include an address of address 2, partition 11; and so forth. After a read of a codeword in a column with an address of address 22, partition 31, a next read of a codeword in a column with an address of address 22, partition 0, and so forth until a last read is from address 31, partition 8. In some examples, memory reads can be issued in order from row 0, partition 0 through row 31, partition 31 and reordering of data can take place to present read data in an order in which it was requested to be written.

In some examples, in response to a read or write request from application 502 for data that is not stored in matrix format or to be stored in matrix format, data position translator 504 can provide a read or write command to media 508 without translation. In some examples, a row read received from application 502 without a matrix identifier is not provided to data position translator 504 by application 502 and the row read is provided directly to media 508 to fulfill the read request and provide the read data to cache or system memory. Capability to bypass data position translator 504 may occur because not all regions of media 508 are populated with two-dimensional matrix data and some regions of media 508 may operate with row wise read/write capability where such regions do not store data with address translation described herein. Bypassing data position translator 504 may occur to read data that is not stored in matrix format or write data that is not to be stored in matrix format.

Figure 6A:
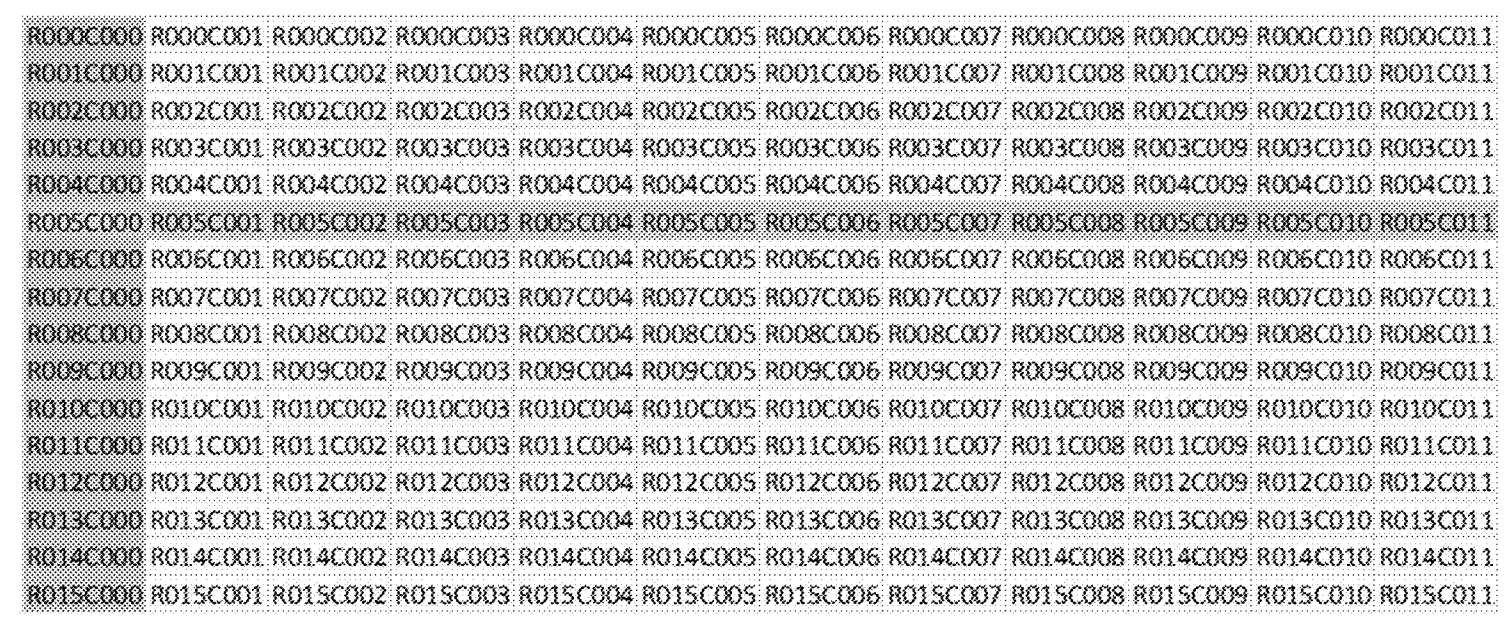

FIG. 6A depicts an example logical layout of data stored in a logical column. Data in the logical column could be read by sequential reads from a same partition. However, as described earlier, reading data associated with logical addresses of a same partition sequentially can increase latency of reading data. Various embodiments provide for assignments of logical addresses in a manner to reduce a number of sequential reads from a same partition. In this example, a matrix includes 12 logical columns (C000 to C011) and 16 logical rows (R000 to R015).

Various embodiments determine a block size, which can include one or more logical rows of data, and utilize a block number or index as a basis to perform address modification to reduce a likelihood of reading a same partition sequentially or repeatedly. For example, a block size can be determined based on a lowest common multiple (LCM) of (number of partitions and number of columns)/number of partitions. A block size can be based on an LCM of an integer number of rows such that a last column and row position would be positioned in a logically last column.

FIG. 6B depicts an example in which a block size can be determined. In some examples, a number of rows in a block can be determined based on whether an end of row terminates at a last logical partition. Rows of data can be sequentially assigned into address and column slots until an end of row terminates at a last logical partition. For example, data in row 0 and column 0 can be assigned to address 0, partition 0; data in row 0 and column 1 can be assigned to address 0, partition 1; and so forth. In this example, a last logical partition is partition 31 (PART31). A last logical column of row 0 (R000C011) occurs at partition 11 (not shown), a last logical columns of row 1 (R001C011) occurs at partition 23 (not shown), and so forth until a last logical column of row 7 (R007C011) occurs at address 2, partition 31. Accordingly, a block size can be determined to be 8 rows and a first block, block 0, includes rows 0 to 7. A second block, block 1, starts with row 8, column 0 (R008C000), at address 3, partition 0, and continues through row 5, partition 31, where a last logical column of row 15 (R015C011) occurs at address 5, partition 31.

FIG. 6C shows a logical data storage layout across partitions which attempts to avoid multiple attempted reads of a same partition sequentially while reading in a row or column direction. Various examples perform a logical address modification whereby an address shift can occur based on a block index associated with particular row of data. For example, codewords can be split across partitions to reduce successive accesses to a same partition. After data is stored in accordance with embodiments, reads can be issued in row wise or column wise direction at approximately equal output rate from the media. Various embodiments attempt to spread codewords across partitions so that successive row reads are made to different partitions.

For example, block 0 includes row 0, columns 0 to 11, through row 7, columns 0 to 11. For block 0, codewords can be assigned sequentially to the block whereby row 0, column 0 is assigned to address 0, partition 0 and so forth through assignment of row 7, column 11 to address 2, partition 31.

For example, block 1 includes row 8, columns 0 to 11, through row 15, columns 0 to 11. For block 1, an address shift corresponding to a block index value (1) can occur so that codewords can be assigned sequentially to the block whereby row 8, column 0 is shifted by one partition and assigned to address 3, partition 1, instead of address 3, partition 0. Shifting of assignments of codewords in the block 1 by one partition can cause assignment of a codeword in row 15, column 11 to address 3, partition 0, instead of its former address 5, partition 31. Codewords associated with row 8, column 1 and so forth can be assigned to address 3, partition 2 and so forth through assignment of row 15, column 10 to address 5, partition 31.

Although not shown, a block 2 can be present that includes row 16, columns 0 to 11, through row 31, columns 0 to 11. For block 2, an address shift corresponding to a block index value (2) can occur so that codewords can be assigned sequentially to the block whereby row 16, column 0 is shifted by two partitions and assigned to address 6, partition 2, instead of address 6, partition 0. Shifting of assignments of codewords in the block 2 by two partitions can cause assignment of a codeword in row 31, column 10 to address 6, partition 0 and assignment of a codeword in row 31, column 11 to address 6, partition 1.

Reading of codewords from a column can occur by reading different partitions. For example, to read data of column 0, the following sequential read operations can take place: PART00 (R0000000), PART12 (R001C000), PART24 (R002C000), PART04 (R003C000), PART16 (R004C000), PART28 (R005C000), PART08 (R006C000), PART20 (R007C000), PART01 (R008C000), PART13 (R009C000), PART25 (R0100000), PART05 (R011C000), PART17 (R012C000), PART29 (R013C000), PART30 (R014C000), and PART21 (R015C000).

In some examples, X number of partition reads can occur before reading to a previously read partition does not result in contention or delay. Accordingly, a number of partitions that are read successively can be at least X and data can be stored in X different partitions so that X different partitions are read before returning to read a previously read partition.

Figure 7A:
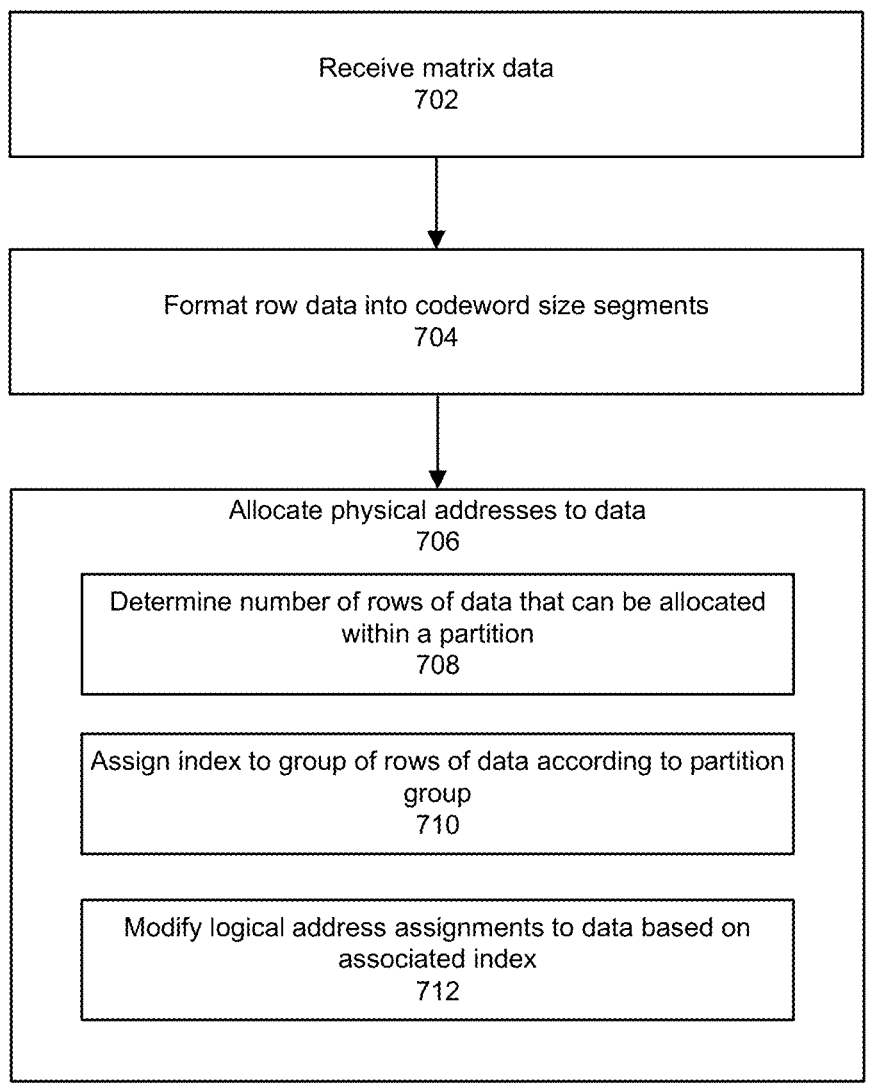
FIGS. 7A and 7B depict example processes.

FIG. 7A shows an example process to write a matrix of data to a media in a manner that attempts to provide sequential reads from different partitions. In some examples, the process can be performed by a memory controller, software and/or firmware that receives or intercepts write requests from a memory access requester, and other examples. At 702, matrix data can be received for storage. Matrix data can be made available by an application, service, microservice, or device in some examples. At 704, row data can be formatted to be in codeword size segments.

At 706, address determination can be performed to associate logical addresses with physical addresses in the media so that for a subsequent read of the data, a number of reads from a same partition is reduced. For example, a physical address can be assigned for logical row and column addresses assigned to a data or codeword and a translation scheme can be stored to translate logical row and column addresses to physical addresses for a subsequent data read operation.

Address determination at 706 can include, at 708, determining a number rows that can be allocated within a partition boundary. For example, at 708, a block size can be determined as a number of rows of codewords whereby a last logical codeword is positioned in a last partition. Address determination at 706 can include, at 710, assigning an index to each group of rows that are positioned within a particular partition. For example, if 8 rows fit within a block, then a block index of 0 can be assigned to rows 0-7, a block index of 1 can be assigned to rows 8-15, and so forth.

Address determination at 706 can include, at 712, modifying logical address assignments to codewords based on a block index associated with the codeword's row. For example, addresses can be shifted based on an associated block index. A block index value of 0 can correspond to a left most column of a row corresponding to a top and left most logical address. A block index value of 1 can correspond to shifting of a left most column of a row to correspond to a top and second to left most logical address, as described herein.

Figure 7B:
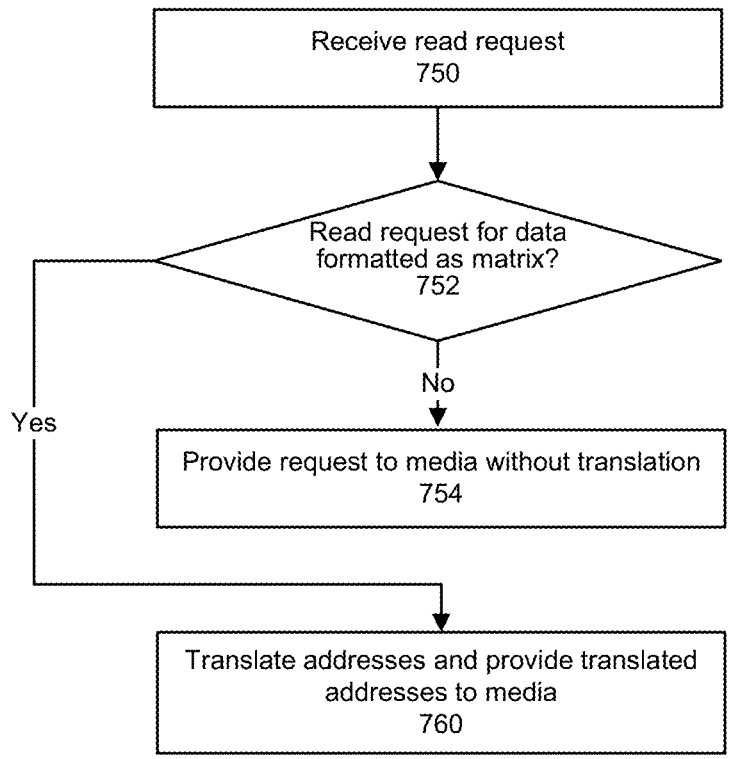

FIG. 7B depicts an example process to perform address translation for data that is stored as a matrix. In some examples, the process can be performed by a memory controller, software and/or firmware that receives or intercepts write requests from a memory access requester, and other examples. At 750, a read request can be received. For example, the request can be received from an application, service, microservice, or device. The read request can include one or more of: a matrix identifier, starting address (e.g., row and column), or ending address (e.g., row and column). At 752, based on the read request not corresponding to a request to read data that is formatted and stored as a matrix in a media, the process can continue to 754. For example, read request not corresponding to a request to read data that is formatted and stored as a matrix in a media can include a request to read data from a region of memory that does not store a matrix or no matrix identifier being provided. At 754, the read request can be provided to a media without translation.

At 752, based on the read request corresponding to a request to read data that is formatted and stored as a matrix in a media, the process can continue to 760. At 760, address translation can take place whereby addresses are determined based on a prior translation performed in connection with a write of the data. For example, the translated addresses can be provided to the media in an order to read out data from the media so that data is read out in an order to match an order of the data presented for writing to the media. Address translation can be performed as described herein.

Figure 8:
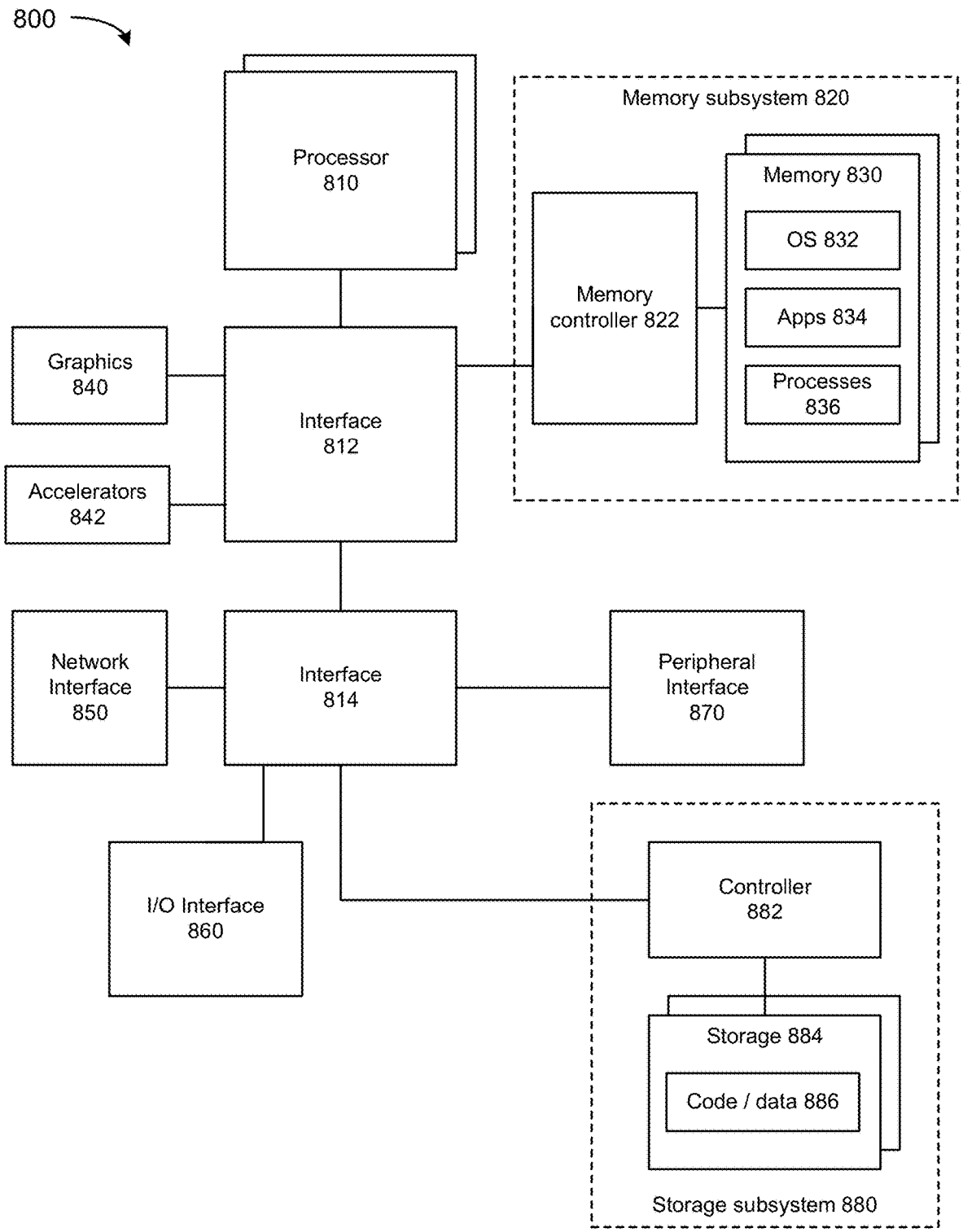
FIG. 8 depicts a system.

FIG. 8 depicts a system. The system can use embodiments described herein to store and access data in a manner to reduce read operations from a same partition. System 800 includes processor 810, which provides processing, operation management, and execution of instructions for system 800. Processor 810 can include any type of microprocessor, central processing unit (CPU), graphics processing unit (GPU), XPU, processing core, or other processing hardware to provide processing for system 800, or a combination of processors. An XPU can include one or more of: a CPU, a graphics processing unit (GPU), general purpose GPU (GPGPU), and/or other processing units (e.g., accelerators or programmable or fixed function FPGAs). Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a programmable or fixed function offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes an apparatus comprising: circuitry to receive a request to store data as a part of a matrix in a memory device; circuitry to allocate address mappings to the data to reduce a number of sequential accesses to a same partition of a portion of the memory device; circuitry to store the address mappings for access with a read operation; and circuitry to cause storage of the data into the memory device according to the address mappings. One or more of the circuitry can be implemented using one or more of a processor executing instructions and/or memory controller.

Example 2 includes one or more examples, wherein the matrix comprises one or more columns and/or one or more rows.

Example 3 includes one or more examples, wherein the memory device comprises one or more of: a three-dimensional (3D) cross point memory device, volatile memory device, or non-volatile memory device.

Example 4 includes one or more examples, wherein the allocate address mappings to the data to reduce a number of sequential accesses to a same partition of a portion of the memory device comprises: identify a number of rows that end at a block boundary; allocate one or more rows to one or more blocks; assign a block index to the one or more blocks; and perform a shift of a logical address assigned to a particular data based on a value of an associated block index.

Example 5 includes one or more examples, wherein the shift comprises a number of right shifts corresponding to an associated block index value.

Example 6 includes one or more examples, wherein the portion of the memory device comprises a portion reserved to store matrix data.

Example 7 includes one or more examples, and includes circuitry to: based on receipt of a read request to access a column of data from the matrix: determine storage location addresses in the memory device to read the column of data from the memory device and provide the determined storage location addresses to the memory device in an order to read out the column of data so that the column of data read out is to match the data associated with the request to store data.

Example 8 includes one or more examples, and includes: circuitry to, based on receipt of a read request to access a row of data that is not stored in a matrix, provide the read request to the memory device and without translation of at least one memory address. The circuitry can be implemented using one or more of a processor executing instructions and/or memory controller.

Example 9 includes one or more examples, and includes the memory device coupled to the circuitry to cause storage of the data into the memory device according to the address mappings.

Example 10 includes one or more examples, wherein the circuitry to receive a request to store data as a part of a matrix in a memory device, the circuitry to allocate address mappings to the data to reduce a number of sequential accesses to a same partition of a portion of the memory device, the circuitry to store the address mappings for access with a read operation, and the circuitry to cause storage of the data into the memory device according to the address mappings comprises one or more of: a processor and/or a memory controller. One or more of the circuitry can be implemented using one or more of a processor executing instructions and/or memory controller.

Example 11 includes one or more examples, and a non-transitory computer-readable medium comprising instructions stored thereon, that if executed by one or more processors, cause the one or more processors to: process a request to store data as a part of a matrix in a memory device; allocate address mappings to the data to reduce a number of sequential accesses to a same partition of a portion of the memory device; store the address mappings for access with a read operation; and cause storage of the data into the memory device according to the address mappings.

Example 12 includes one or more examples, the memory device comprises one or more of: a three-dimensional (3D) cross point memory device, volatile memory device, or non-volatile memory device.

Example 13 includes one or more examples, wherein the allocate address mappings to the data to reduce a number of sequential accesses to a same partition of a portion of the memory device comprises: identify a number of rows that end at a block boundary; allocate one or more rows to one or more blocks; assign a block index to the one or more blocks; and perform a shift of a logical address assigned to a particular data based on a value of an associated block index, wherein the shift comprises a number of right shifts corresponding to an associated block index value.

Example 14 includes one or more examples, wherein the portion of the memory device comprises a portion reserved to store matrix data.

Example 15 includes one or more examples, and includes instructions stored thereon, that if executed by one or more processors, cause the one or more processors to: based on receipt of a read request to access a column of data from the matrix: determine storage location addresses in the memory device to read the column of data from the memory device and provide the determined storage location addresses to the memory device in an order to read out the column of data so that the column of data read out is to match the data associated with the request to store data.

Example 16 includes one or more examples, and includes instructions stored thereon, that if executed by one or more processors, cause the one or more processors to: based on receipt of a read request to access a row of data that is not stored in a matrix, provide the read request to the memory device and without translation of at least one memory address.

Example 17 includes one or more examples, and includes a method comprising: processing a request to store data as a part of a matrix in a memory device; allocating address mappings to the data to reduce a number of sequential accesses to a same partition of a portion of the memory device; storing the address mappings for access with a read operation; and causing storage of the data into the memory device according to the address mappings.

Example 18 includes one or more examples, wherein the allocating address mappings to the data to reduce a number of sequential accesses to a same partition of a portion of the memory device comprises: identifying a number of rows that end at a block boundary; allocating one or more rows to one or more blocks; assigning a block index to the one or more blocks; and performing a shift of a logical address assigned to a particular data based on a value of an associated block index, wherein the shift comprises a number of right shifts corresponding to an associated block index value.

Example 19 includes one or more examples, and includes: based on receipt of a read request to access a column of data from the matrix: determining storage location addresses in the memory device to read the column of data from the memory device and providing the determined storage location addresses to the memory device in an order to read out the column of data so that the column of data read out is to match the data associated with the request to store data.

Example 20 includes one or more examples, and includes: based on receipt of a read request to access a row of data that is not stored in a matrix, providing the read request to the memory device and without translation of at least one memory address

What is claimed is:

1. An apparatus comprising:
   circuitry to receive a request to store data as a part of a matrix in a memory device;
   circuitry to allocate address mappings to the data in a portion of the memory device, wherein the allocate address mappings to the data in the portion of the memory device is based on a number of rows that end in a block boundary;
   circuitry to store the address mappings for access with a read operation;
   circuitry to cause storage of the data into the memory device according to the address mappings; and
   circuitry to, based on receipt of a read request to access a row of data that is not stored in the matrix, provide the read request to the memory device and without translation of a memory address.

2. The apparatus of claim 1, wherein the matrix comprises one or more columns and/or one or more rows.

3. The apparatus of claim 1, wherein the memory device comprises one or more of: a three-dimensional (3D) cross point memory device, volatile memory device, or non-volatile memory device.

4. The apparatus of claim 1, wherein the allocate address mappings to the data to reduce a number of sequential accesses to a same partition of a portion of the memory device comprises:
   identify the number of rows that end at the block boundary;
   allocate one or more rows to one or more blocks;
   assign a block index to the one or more blocks; and
   perform a shift of a logical address assigned to a particular data based on a value of an associated block index.

5. The apparatus of claim 4, wherein the shift comprises a number of right shifts corresponding to an associated block index value.

6. The apparatus of claim 1, wherein the portion of the memory device comprises a portion reserved to store matrix data.

7. The apparatus of claim 1, comprising:
   circuitry to:
     based on receipt of a read request to access a column of data from the matrix:
       determine storage location addresses in the memory device to read the column of data from the memory device and
       provide the determined storage location addresses to the memory device in an order to read out the column of data so that the column of data read out is to match the data associated with the request to store data.

8. The apparatus of claim 1, comprising the memory device coupled to the circuitry to cause storage of the data into the memory device according to the address mappings.

9. The apparatus of claim 1, wherein the circuitry to receive a request to store data as a part of a matrix in a memory device, the circuitry to allocate address mappings to the data, the circuitry to store the address mappings for access with a read operation, and the circuitry to cause storage of the data into the memory device according to the address mappings comprises one or more of: a processor and/or a memory controller.

10. At least one non-transitory computer-readable medium comprising instructions stored thereon, that if executed by one or more processors, cause the one or more processors to:
    process a request to store data as a part of a matrix in a memory device;
    allocate address mappings to the data in a portion of the memory device, wherein the allocate address mappings to the data in the portion of the memory device is based on a number of rows that end in a block boundary;
    store the address mappings for access with a read operation; and
    cause storage of the data into the memory device according to the address mappings.

11. The computer-readable medium of claim 10, wherein the memory device comprises one or more of: a three-dimensional (3D) cross point memory device, volatile memory device, or non-volatile memory device.

12. The computer-readable medium of claim 10, wherein the allocate address mappings to the data comprises:
    identify the number of rows that end at the block boundary;
    allocate one or more rows to one or more blocks;
    assign a block index to the one or more blocks; and
    perform a shift of a logical address assigned to a particular data based on a value of an associated block index, wherein the shift comprises a number of right shifts corresponding to an associated block index value.

13. The computer-readable medium of claim 10, wherein the portion of the memory device comprises a portion reserved to store matrix data.

14. The computer-readable medium of claim 10, comprising instructions stored thereon, that if executed by one or more processors, cause the one or more processors to:
based on receipt of a read request to access a column of data from the matrix:
determine storage location addresses in the memory device to read the column of data from the memory device and
provide the determined storage location addresses to the memory device in an order to read out the column of data so that the column of data read out is to match the data associated with the request to store data.

15. The computer-readable medium of claim 10, comprising instructions stored thereon, that if executed by one or more processors, cause the one or more processors to:
based on receipt of a read request to access a row of data that is not stored in a matrix, provide the read request to the memory device and without translation of at least one memory address.

16. A method comprising:
processing a request to store data as a part of a matrix in a memory device;
allocating address mappings to the data in a portion of the memory device, wherein the allocating address mappings to the data in the portion of the memory device is based on a number of rows that end in a block boundary;
storing the address mappings for access with a read operation; and
causing storage of the data into the memory device according to the address mappings.

17. The method of claim 16, wherein the allocating address mappings to the data comprises:
identifying the number of rows that end at the block boundary;
allocating one or more rows to one or more blocks;
assigning a block index to the one or more blocks; and
performing a shift of a logical address assigned to a particular data based on a value of an associated block index, wherein the shift comprises a number of right shifts corresponding to an associated block index value.

18. The method of claim 16, comprising:
based on receipt of a read request to access a column of data from the matrix:
determining storage location addresses in the memory device to read the column of data from the memory device and
providing the determined storage location addresses to the memory device in an order to read out the column of data so that the column of data read out is to match the data associated with the request to store data.

19. The method of claim 16, comprising:
based on receipt of a read request to access a row of data that is not stored in a matrix, providing the read request to the memory device and without translation of at least one memory address.

* * * * *